(12) United States Patent
Keller (10) Patent No.: US 9,648,867 B1
(45) Date of Patent: May 16, 2017

(54) IN-GROUND BLIND

(71) Applicant: Paul Francis Keller, Waterloo, WI (US)

(72) Inventor: Paul Francis Keller, Waterloo, WI (US)

( * ) Notice: Subject to any disclaimer, the term of this patent is extended or adjusted under 35 U.S.C. 154(b) by 0 days.

(21) Appl. No.: 15/011,315

(22) Filed: Jan. 29, 2016

(51) Int. Cl.
*A01M 31/02* (2006.01)
*E02D 29/14* (2006.01)
*E02D 29/12* (2006.01)

(52) U.S. Cl.
CPC ......... *A01M 31/025* (2013.01); *E02D 29/124* (2013.01); *E02D 29/149* (2013.01); *E02D 29/1427* (2013.01); *E02D 29/1472* (2013.01)

(58) Field of Classification Search
CPC .. A01M 31/025; E02D 29/149; E02D 29/124; E02D 29/1427; E02D 29/1472
See application file for complete search history.

(56) References Cited

U.S. PATENT DOCUMENTS

| | | | | |
|---|---|---|---|---|
| 2,837,777 A * | 6/1958 | White | ............... | E04H 1/12 135/87 |
| 2,992,503 A * | 7/1961 | Webb | ............... | A01M 31/00 135/901 |
| 3,018,857 A * | 1/1962 | Parham | ............... | E04H 15/001 135/901 |
| 3,513,605 A * | 5/1970 | Smith | ............... | A01M 31/025 135/901 |
| 3,974,599 A * | 8/1976 | Grosh | ............... | E02D 29/12 52/169.6 |
| 4,571,898 A * | 2/1986 | Le Cacheux | ............... | E04H 1/1222 40/554 |
| 4,632,138 A * | 12/1986 | Irwin | ............... | E04H 15/001 135/901 |
| 4,798,019 A * | 1/1989 | Sury | ............... | A01M 31/025 135/901 |
| 5,117,593 A * | 6/1992 | Tiernan | ............... | E04H 7/24 52/169.6 |
| 5,479,738 A * | 1/1996 | Danna | ............... | A01M 31/025 135/901 |
| 5,657,587 A * | 8/1997 | Gefroh | ............... | E04F 17/06 405/284 |
| 5,901,506 A * | 5/1999 | Zicaro | ............... | E02D 29/12 52/20 |
| 6,415,807 B1 * | 7/2002 | Maher | ............... | A01M 31/025 135/901 |
| 6,553,725 B2 * | 4/2003 | Washington | ............... | A01M 31/025 135/901 |
| 6,881,007 B2 * | 4/2005 | Dennis | ............... | E02D 29/1427 404/25 |
| 7,144,189 B1 * | 12/2006 | Bongiovanni | ............... | B65D 90/105 404/25 |
| 8,033,060 B2 * | 10/2011 | Parker | ............... | E04B 7/08 220/252 |

(Continued)

FOREIGN PATENT DOCUMENTS

CN 201842415 U * 5/2011
GB EP 1398419 A1 * 3/2004 ............ E02D 29/12

(Continued)

*Primary Examiner* — Jeanette E Chapman (57) ABSTRACT

A portable pit-type hunting blind of thermoplastic exterior which can be carried and placed into a dug hole, providing a securable preserved cavity of variable depth, and rotatable seat proximate to the earth's surface.

14 Claims, 6 Drawing Sheets

(56) References Cited

U.S. PATENT DOCUMENTS

| | | | |
|---|---|---|---|
| 8,756,872 B2* | 6/2014 | Preg | A01M 31/025 |
| | | | 135/901 |
| 9,121,157 B2* | 9/2015 | Wasiuta | E02D 29/1409 |
| 9,247,727 B2* | 2/2016 | Peterson | |
| 9,267,261 B2* | 2/2016 | Royer | E02D 29/14 |
| 2005/0028854 A1* | 2/2005 | Erickson | E04H 15/001 |
| | | | 135/97 |
| 2006/0127178 A1* | 6/2006 | Akkala | E02D 29/14 |
| | | | 404/25 |
| 2008/0063471 A1* | 3/2008 | Veldboom | E02D 29/1418 |
| | | | 404/25 |
| 2010/0124458 A1* | 5/2010 | Munro | E02D 29/12 |
| | | | 404/26 |
| 2010/0229906 A1* | 9/2010 | Putman | A01M 31/025 |
| | | | 135/96 |
| 2013/0146113 A1* | 6/2013 | Hawk, III | A01M 31/025 |
| | | | 43/1 |
| 2016/0242551 A1* | 8/2016 | Anastos | A47C 9/10 |

FOREIGN PATENT DOCUMENTS

| | | | | |
|---|---|---|---|---|
| JP | 08170359 A | * | 7/1996 | |
| JP | 11229417 A | * | 8/1999 | |
| JP | 2005048568 A | * | 2/2005 | |
| JP | 2005296934 A | * | 10/2005 | |

* cited by examiner

IN-GROUND BLIND

CROSS-REFERENCE TO RELATED APPLICATIONS

This application claims the benefit of PPA Application No. 62/110,570 filed Feb. 1, 2015 by the present inventor which is incorporated by reference.

FEDERALLY SPONSORED RESEARCH

Not applicable

BACKGROUND-PRIOR ART

The following patents appear relevant:

| Pat. No. | Kind Code | Issue Date | Patentee |
|---|---|---|---|
| U.S. 8,727,190 | B2 | May 20, 2014 | Blair |
| U.S. 8,579,007 | | Nov. 12, 2013 | Pottmeyer et.al. |
| U.S. 6,668,977 | B2 | Dec. 30, 2003 | Arsenault |
| U.S. 3,513,605 | | May 26, 1970 | H.A. Smith |
| U.S. 7,013,829 | | Mar. 21, 2006 | Alexander |
| U.S. 7,325,364 | B2 | Feb. 05, 2008 | Leininger et. al. |
| U.S. 5,822,906 | | Oct. 20, 1998 | Ward |
| U.S. 7,565,909 | B2 | Jul. 28, 2009 | Reis et. al. |
| U.S. 8,789,548 | B2 | Jun. 29, 2014 | Atherton |

Hunters have concealed themselves from game to achieve the element of surprise for eons. The first hunters likely hid behind trees and rocks while waiting for game to approach. Eventually hunters moved brush and other natural materials to hide in locations more suitable for ambushing animals. Manmade materials are being used today to get hunters out of view of their quarry. Surrounds, tree stands, box blinds, pit blinds, and tent blinds are all used by hunters today, each with their own benefits and limitations.

A "surround" hides a hunter behind a screen of man-made material, such as camouflaged cloth, as in issued U.S. Pat. No. 8,727,190B2, or mirrored panels as in issued U.S. Pat. No. 8,579,007. Usually the hunter sits on a chair or similar device behind the screening. These materials are usually carried, set up, taken down, and removed by the hunter each day.

Tree stands of various design allow hunters to sit or stand above their quarry's line of sight. Tree stands use a tree to support them, so they require a tree of proper size to be in the preferred location, and require pruning of surrounding vegetation in most cases. They are usually attached to the tree with a chain or strap which must be replaced or adjusted frequently. The tree can impede visibility and shooting opportunities. It is difficult to secure a tree stand against use by trespassers. Tree stands also make falling out of the tree a serious concern. Issued U.S. Pat. No. 6,668,977B2 shows such a device.

Box blinds can be described as a small house with windows for viewing and shooting. They may be at ground level or elevated, and are usually large enough for more than one hunter. They are expensive and time-consuming to build, unattractive, difficult to move, and diminish the outdoor experience because of their indoor nature.

Pit blinds are primarily used in waterfowl hunting but more recently are being used to hunt big game as well. Issued U.S. Pat. No. 3,513,605 shows such a device. A hole is dug in the ground to a depth suitable for concealing the hunter, and a housing is buried in the hole, or a housing is placed in water, as in issued U.S. Pat. No. 7,013,829. The sides of the blind are usually reinforced with steel or other strong material to prevent the sides of the hole from caving in. They are expensive to build and ship, and are not considered portable due to the time and effort required to repair the first location, move to, and excavate the new location, as in the device shown in issued U.S. Pat. No. 7,325,364B2. They usually require a deep soil profile suitable for digging, and prohibit the use of archery gear because of their depth or orientation as in issued U.S. Pat. No. 5,822,906.

Tent blinds as in issued U.S. Pat. No. 7,565,909B2 conceal the hunter at ground level, or in the bed of a truck as in issued U.S. Pat. No. 8,789,548B2, in a small camouflage enclosure. Windows allow the hunter limited viewing and shooting opportunities. These blinds are hot in warm weather, and limit the outdoor experience due to their walled construction.

Many of today's hunters continue to wait to ambush game like the earliest hunters by standing vertically near natural cover, or by sitting on a natural seat such as a fallen log. The duration of the hunt often makes this type of wait an uncomfortable one.

SUMMARY OF THE EMBODIMENTS

An improved in-ground hunting blind is provided which can be used by gun and archery hunters for deer, turkey, predator, and waterfowl hunting as well as wildlife observation. Hunters, and more uniquely archers, have unrestricted viewing and shooting when hunting from this blind. Thermoplastic with ultra-violet inhibitors is roto-molded to form a housing which may preserve a hole dug in the earth. Its components provide the user a safe, secure, dry, affordable, portable, and low-profile seating location at ground level. Its lid controls access to the cavity via a locking mechanism and keeps rain out of the cavity. Its base connects the housing to the lid via a hinging mechanism and the housing to the earth via a staking mechanism. The housing's sidewalls keep soil moisture out of the cavity, and allow the bottom feature of the blind to be located at various depths to accommodate users of varied size. A support platform provides strength to the lid in the stored position, and becomes a rotatable, relocatable seat when the blind is in use. The improved in-ground blind can be affordably made and shipped, rapidly installed and relocated, and can be placed nearly anywhere a cavity can be formed, including in shallow water as found in marshes.

BRIEF DESCRIPTION OF THE DRAWINGS

FIG. 1-6 is a perspective view of the improved in-ground blind with its lid closed.

FIG. 2-6 is a perspective view of the improved in-ground blind with its lid open.

FIG. 3-6 is an exploded view of the improved in-ground blind.

FIG. 4A-6 is a sectional view of the improved in-ground blind with its lid open.

FIG. 4B-6 is a sectional view of the improved in-ground blind with its lid closed.

FIG. 5-6 is a perspective view of a support platform.

FIG. 6-6 is a perspective view of a second embodiment.

DETAILED DESCRIPTION OF THE SPECIFIC EMBODIMENT

Figure 16:
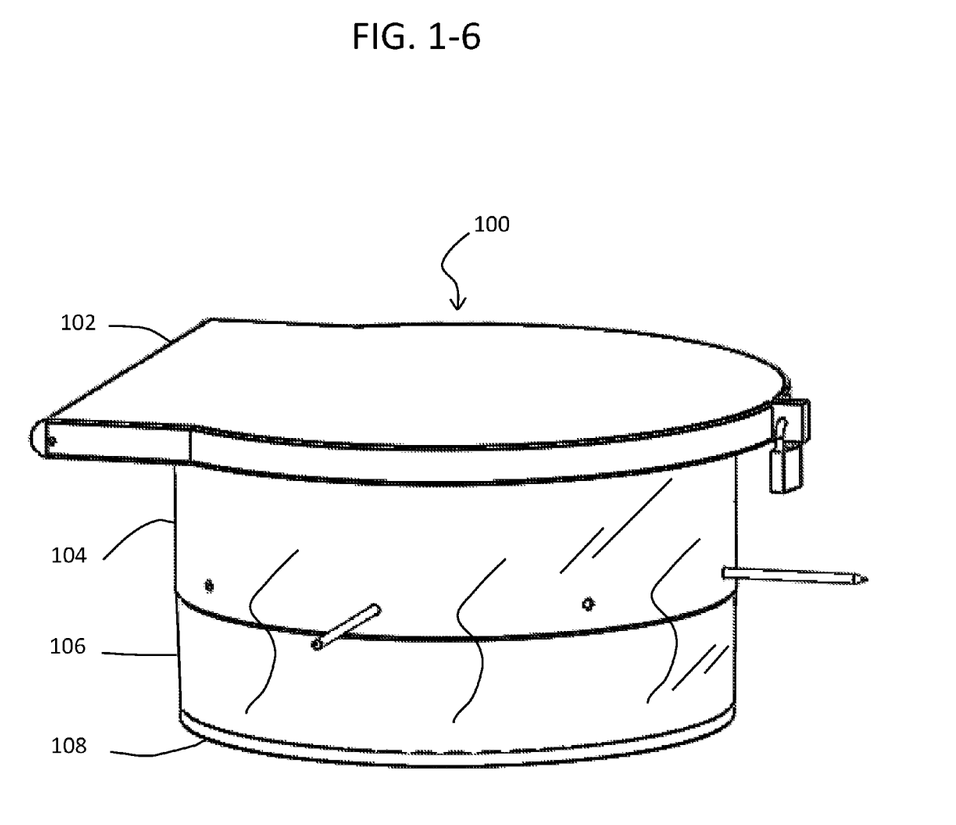
Figure 26:
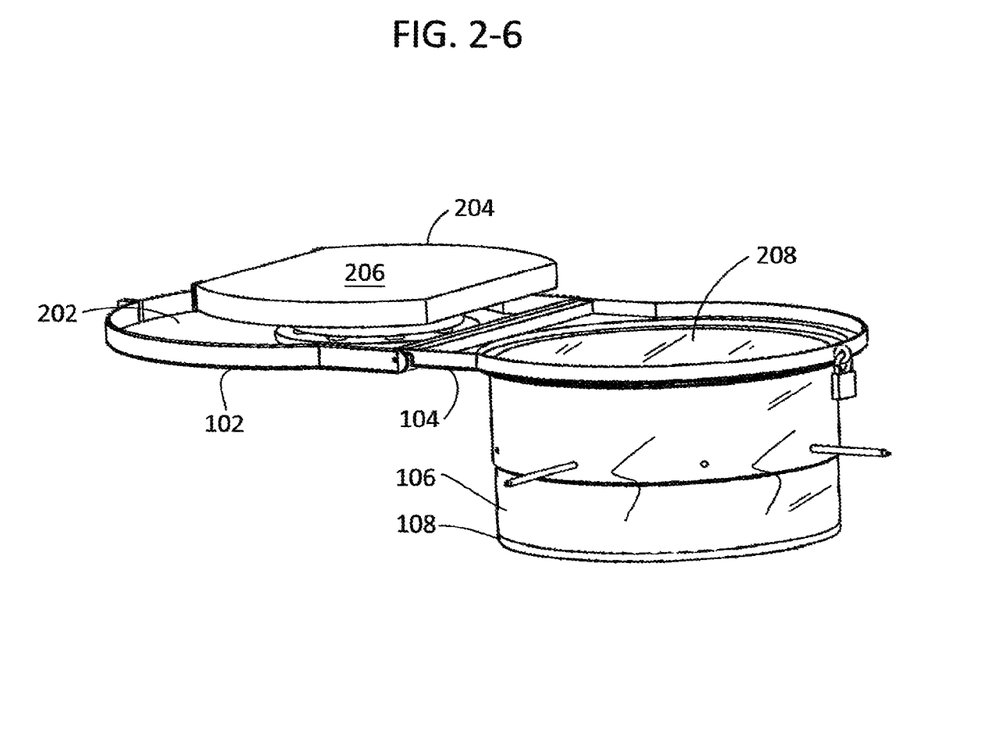

Major Components of the First Embodiment-FIG. 1-6, FIG. 2-6

FIG. 1-6 of the first embodiment shows a perspective view of the main components of the improved in-ground blind 100 in its stored, or closed position. A housing lid 102, is attached to a housing base 104, which supports housing sidewalls 106, which contain a housing bottom 108.

FIG. 2-6 of the first embodiment shows a perspective view of the improved in-ground blind 100 with the housing lid 102 in the opened position. This view reveals a seating surface 202, providing a substantially horizontal surface for a support platform 204, to become a seat 206 for a user. This view also reveals a cavity 208 formed by the housing base 104, housing sidewalls 106, and housing bottom 108. The cavity 208 provides room for the user's feet and legs, when sitting on the seat 206, or standing on the housing bottom 108.

Operation-FIG. 3-6, FIG. 4A-6, FIG. 4B-6, FIG. 5-6

Figure 36:
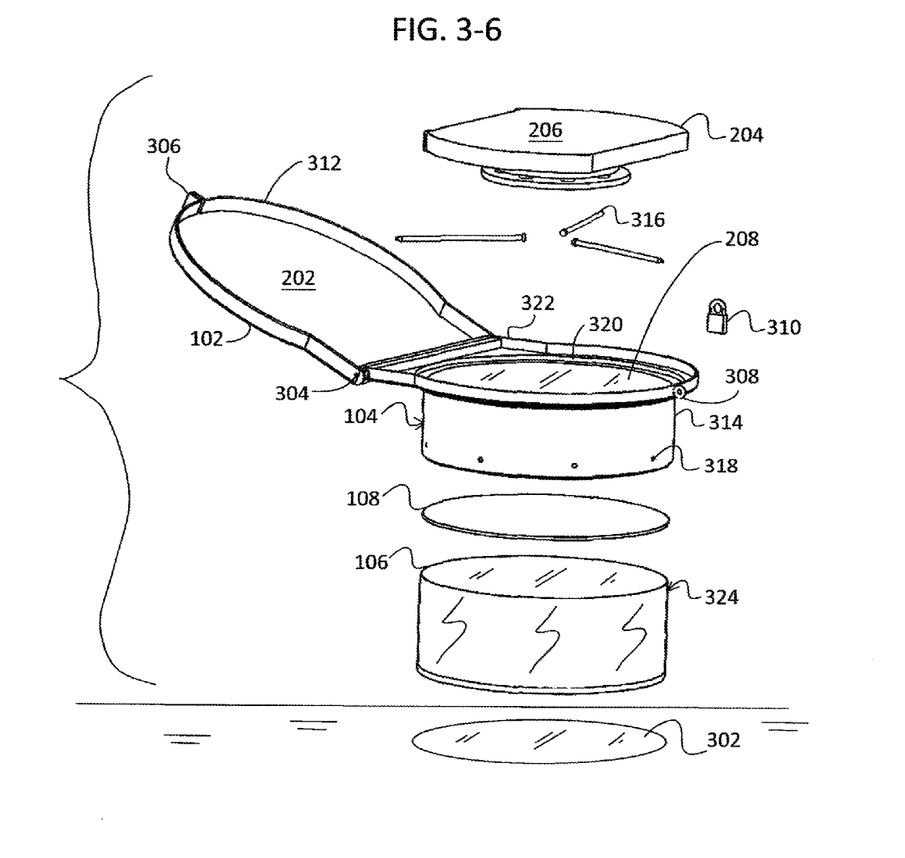

A circular roto-molded plastic housing base 104 may be placed in a hole 302 dug in the earth, to provide a seat 206 for the user to sit upon, and a cavity 208 of sufficient size for the feet and lower legs of the user when sitting or standing. A housing lid 102 controls access to the cavity 208 via a connecting pivot point 304, and a lock latch 306, which may be latched to the lock eyebolt 308 in the housing base 104, with a padlock 310.

A drip edge 312 around the entire perimeter of the housing lid 102 prevents rain from entering the cavity 208 when the housing lid 102 is in the closed position, as shown in FIG. 1-6

FIG. 4A-6 is a sectional view showing the housing base 104 with the attached housing lid 102 in the open position. The rear drip edge 402 has a lower profile than the rest of the drip edge 312 to allow the 180° rotation necessary for housing lid 102 operation. FIG. 4B-6 is a sectional view showing the housing base 104 with the housing lid 102 in the closed position. The housing lid return channel 406 provides space for the rear drip edge 402 to rotate past the pivot point 304 when the housing lid 102 is opened.

The pivot point 304 also serves to connect the housing lid 102 to the housing base 104. Various connectors may serve this function: rivets, bolts and nuts, integral molded socket and stud, etc. The chosen connecting method must make the housing lid 102 tamper resistant to trespassers when the housing lid 102 is closed and locked, as in FIG. 1-6. The chosen connecting method should also make the opening and closing operations nearly silent, by avoiding metal-to-metal contact.

Referring to FIG. 3-6, the housing base 104 prevents hole 302 collapse via housing base sidewalls 314. The housing base sidewall 314 vertical dimension may vary in the manufacturing process to match regional soil characteristics. A dimension equal to half the expected hole 302 depth is generally sufficient to prevent hole 302 collapse for many years. Minimizing this dimension also reduces manufacturing and shipping costs.

Figure 4A:
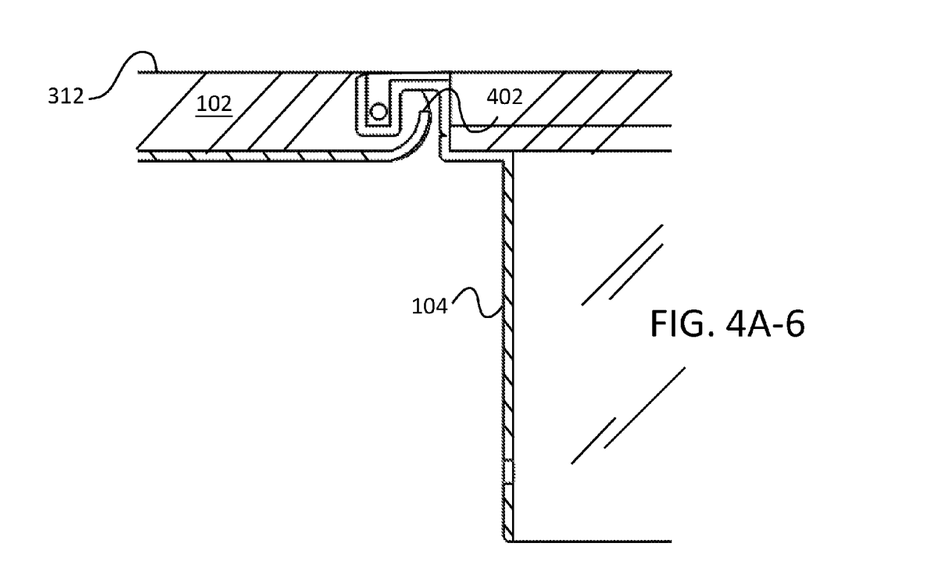
Figure 4B:
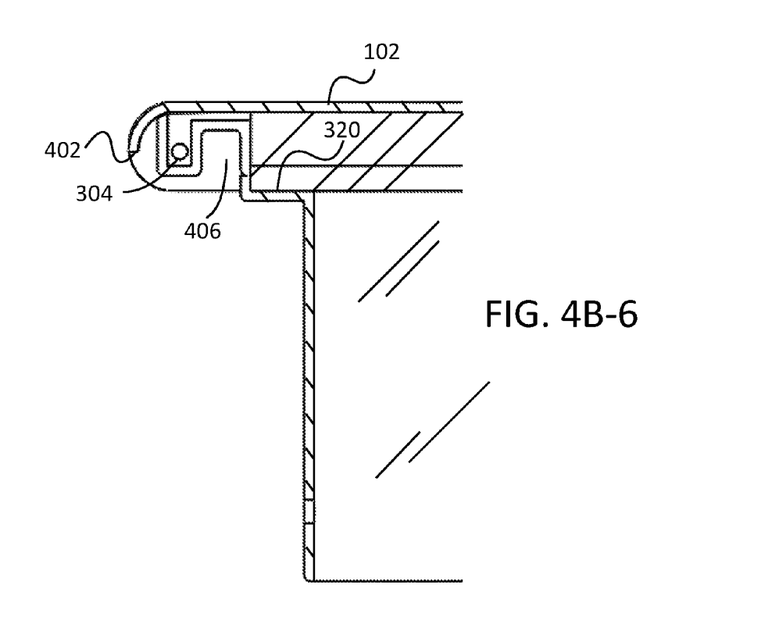

Stakes 316 of metal or other rigid material pushed by hand, screwed, or driven through a plurality of holes 318 anchor the housing base 104 to the earth, hindering theft. A support platform shelf 320 (also shown in FIG. 4B-6), holds the support platform 204 when the housing lid 102 is in the closed position FIG. 1-6. The support platform shelf 320 also supports the housing base 104 on the surface of the earth, providing clearance for the rear-most drip edge 402 during housing lid 102 operation, and elevation to the entire drip edge 312 to prevent freezing of the housing lid 102 to the earth in icing conditions. The vertical outer rim 322 of the housing base 104 also helps to prevent water from entering the cavity 208, and helps support the housing lid 102 in the closed position, FIG. 1-6. The lock eyebolt 308 is attached through the vertical outer rim 322 of the housing base 104. The lock eyebolt 308 aligns with the lock latch 306 on the housing lid 102 in the closed position shown in FIG. 1-6.

The improved in-ground blind 100 must accommodate users of varied size. A shorter user will need a shallower cavity 208 than a taller user, so that their feet and legs are supported when in the seated position. The vertical dimension of the cavity 208 is determined by the depth of the hole 302 dug by the user. The housing sidewalls 106 serve as a vapor barrier for the cavity 208 and prevent soil from contacting the user's legs. A plastic bag 324 serves this function very well, and reduces manufacturing and shipping costs when compared to a rigid structure. The plastic bag 324 is placed on the exterior of the housing base sidewalls 314 when placed in the hole 302 by the user. Stakes 316 are pushed, screwed, or driven into the earth at a substantially horizontal orientation through the plurality of holes 318, in the housing base 104 and through the plastic bag 324 serving as housing sidewalls 106. The housing bottom 108 is placed into the plastic bag 324 for the user to place their feet upon, and to prevent damage to the plastic bag 324.

Figure 56:
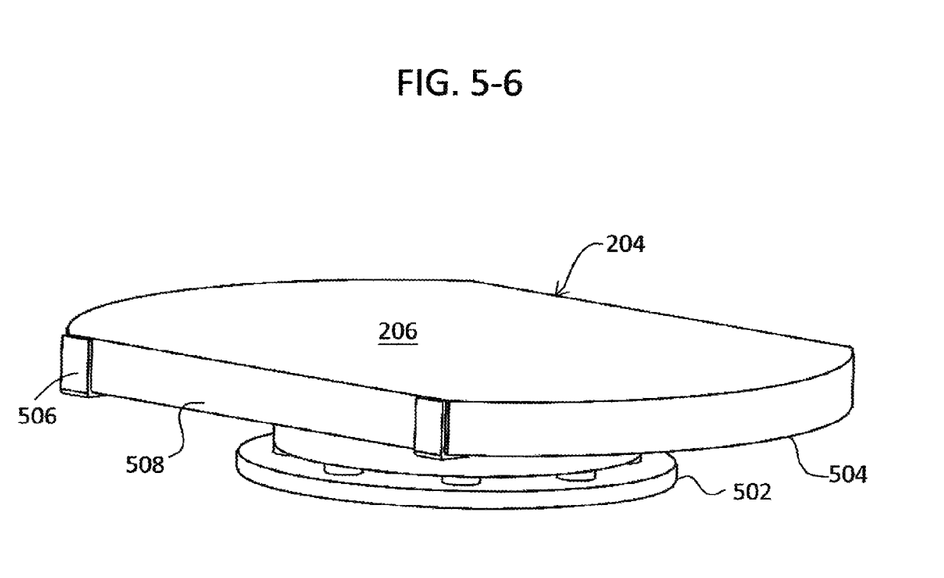

FIG. 5-6 shows a perspective view of the support platform 204. The support platform 204 strengthens the housing lid 102 in the closed position of FIG. 1-6. The support platform 204 also serves as a seat 206 which may rotate on a swivel plate 502 attached to the bottom surface 504 of the support platform 204. The swivel plate 502 must function silently to avoid spooking game. Users of varied size may adjust the location of the support platform 204 on the seating surface 202 toward and away from the cavity 208 to obtain a comfortable seating position. The support platform 204 is roto-molded of thermoplastic, or built of another strong, decay-resistant material. Metal brackets 506 may be attached to one or more sides 508 of the support platform 204 to hold an accessory device (not disclosed) which might serve wind, and rain-shielding functions.

Second Embodiment

Figure 66:
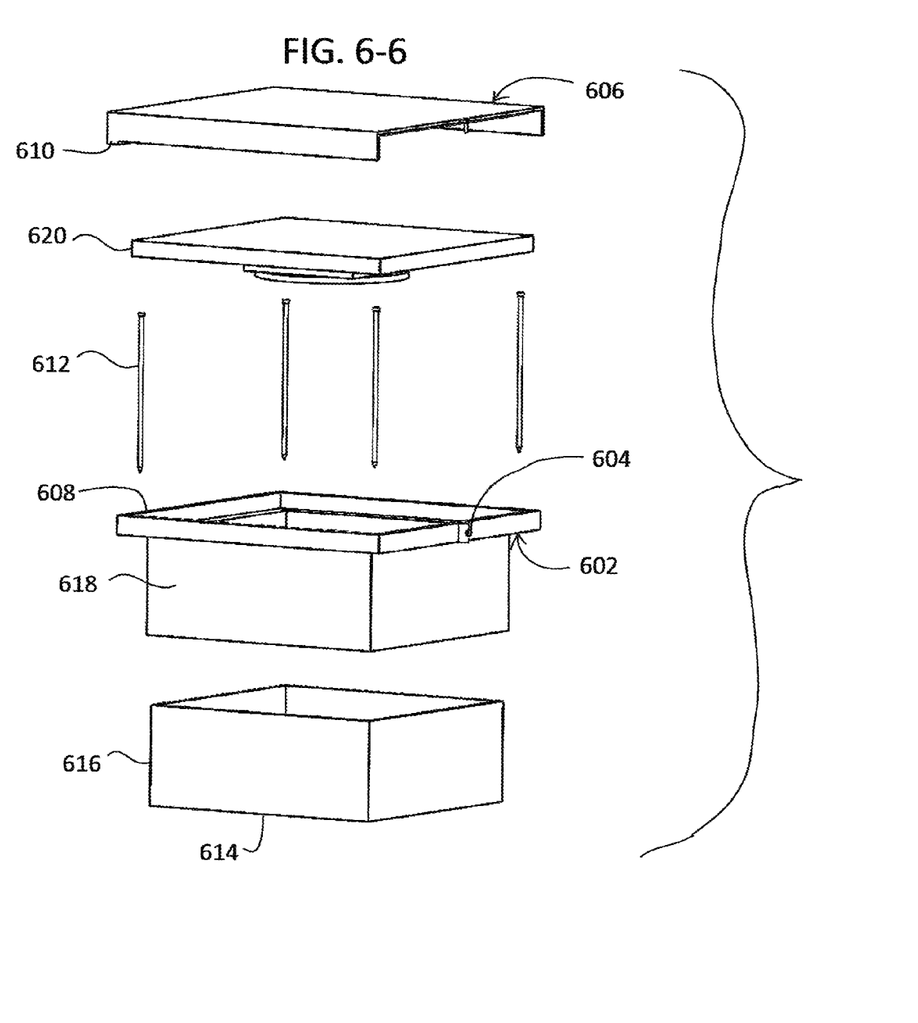

FIG. 6-6 shows a perspective view of a second embodiment. The housing base 602 may form an oval, rectangular, square or polygonal cavity. An integral lock 604 built into the housing base 602 or housing lid 606 may perform the locking function. A gasket 608 between the housing lid 606 and the housing base 602 may perform the rain exclusion function. Various methods such as overlapping parts 610 (shown), molded socket and stud, rivets, or latches could join the housing lid 606 and housing base 602. The anchoring function may be performed by orienting the stakes 612 in the substantially vertical direction through the top of the housing base 602. The housing bottom 614 and housing sidewalls 616 might be molded together as one piece, and remain separate from the housing base sidewalls 618, to shift in freeze and thaw conditions, without heaving the house base 602. In this embodiment the housing lid 606 may be structured sufficiently to withstand any expected load, or may use a support platform 620 as in the first embodiment.

I claim:

1. A portable pit blind with a thermoplastic exterior housing of a predetermined weight and dimension which can be easily carried by an average human being, made and shipped at conservative cost, and when placed in a hole in the earth dug by a user, provides a seating surface near the surface of said earth for said user to sit upon and a preserved cavity of variable depth and sufficient diameter for the feet and lower legs of said user in a seated position, said portable pit blind comprising:
   a. a housing lid, which provides means for controlling access to said cavity via a locking mechanism, means for preventing rain from entering said cavity when said housing lid is closed via a rain-exclusion mechanism, means for seating via a substantially horizontal surface of opened said housing lid, and a means for secure attachment via a connecting mechanism, to a
   b. housing base, which provides means for preserving the sides of said dug hole from collapse via housing base sidewalls, and provides means for securing said housing to said earth via a staking mechanism through a plurality of holes in said housing base, and means for containing a rotatable seat via its structure, and
   c. housing sidewalls, which provide means for the vertical dimension of said cavity to vary and for the prevention of heaving of said housing during freezing and thawing cycles via a non-rigid connection to said housing base, and means for preserving a dry cavity, and a
   d. housing bottom, which provides means for support of said feet of said user of said housing via its structure and orientation, and is rigidly attached to said housing sidewalls if molded as one piece with said housing sidewalls, and is separate if said housing sidewalls are of flexible plastic vapor barrier bag construction,
   whereby said portable pit blind provides improved means for a shippable, portable, securable, dry, durable, and low-profile hunting location suitable for an archer, with unrestricted viewing and shooting via placement in said hole, dug by said user, in said earth.

2. The portable pit blind of claim 1 wherein said housing is molded of thermoplastic containing ultra-violet inhibitors.

3. The portable pit blind of claim 1 wherein said locking mechanism is a latching padlock.

4. The portable pit blind of claim 1 wherein said rain-exclusion mechanism is a peripheral drip edge.

5. The portable pit blind of claim 1 wherein said housing lid-to-said housing base connecting mechanism is two threaded connectors with locking nuts.

6. The portable pit blind of claim 1 wherein said staking mechanism is metal rod stakes.

7. The portable pit blind of claim 1 wherein said drip edge of said housing lid may rotate past the pivot point of said housing base in a lid return channel of said housing base.

8. The portable pit blind of claim 1 wherein said housing base supports said housing lid via a substantially vertical outer rim and a support platform.

9. The portable pit blind of claim 1 wherein said support platform is relocatable.

10. The portable pit blind of claim 1 wherein said support platform is supported by a support platform shelf in said housing base.

11. The portable pit blind of claim 1 wherein said support platform shelf provides clearance for said housing lid drip edge.

12. The portable pit blind of claim 1 wherein said support platform may rotate on a swivel device.

13. The portable pit blind of claim 1 wherein said housing sidewalls are a plastic bag.

14. The portable pit blind of claim 1 wherein said bottom is a thermoplastic disc.

* * * * *